(12) United States Patent
Lim

(10) Patent No.: US 12,516,720 B2
(45) Date of Patent: Jan. 6, 2026

(54) DRIVING DEVICE FOR ELECTRIC VEHICLES

(71) Applicants: Hyundai Motor Company, Seoul (KR); Kia Corporation, Seoul (KR)

(72) Inventor: Seong Yeop Lim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/965,691

(22) Filed: Dec. 2, 2024

(65) Prior Publication Data

US 2025/0198491 A1 Jun. 19, 2025

(30) Foreign Application Priority Data

Dec. 13, 2023 (KR) .................. 10-2023-0180625

(51) Int. Cl.
*F16H 37/08* (2006.01)
*B60K 1/02* (2006.01)
*B60K 17/16* (2006.01)

(52) U.S. Cl.
CPC .......... *F16H 37/0806* (2013.01); *B60K 1/02* (2013.01); *B60K 17/20* (2013.01); *F16H 2200/0021* (2013.01); *F16H 2200/2007* (2013.01); *F16H 2200/201* (2013.01); *F16H 2200/2033* (2013.01); *F16H 2200/2038* (2013.01); *F16H 2200/2094* (2013.01)

(58) Field of Classification Search
CPC ......... F16H 37/0806; F16H 2200/0021; F16H 2200/2007; F16H 2200/201; F16H 2200/2033; F16H 2200/2038; F16H 2200/2094; B60K 1/02; B60K 17/20
See application file for complete search history.

(56) References Cited

U.S. PATENT DOCUMENTS

| | | | |
|---|---|---|---|
| 2018/0340595 A1* | 11/2018 | Nilsson .................. | F16H 3/728 |
| 2022/0153118 A1* | 5/2022 | Shibata ................. | B60K 6/445 |
| 2023/0068411 A1* | 3/2023 | Guo ..................... | F16H 37/0806 |
| 2023/0191897 A1* | 6/2023 | Rulfi Fertilio ......... | B60K 6/448 475/5 |

* cited by examiner

*Primary Examiner* — Farhana Pervin
(74) *Attorney, Agent, or Firm* — Morgan Lewis & Bockius LLP

(57) ABSTRACT

A driving apparatus for an electric vehicle includes a first motor transmits driving torque to the wheels on both sides, and including a first motor shaft of a hollow shaft, a second motor disposed parallel to the first motor, an output shaft coaxially disposed with a second motor shaft of the second motor, a first reduction mechanism including a first planetary gear set disposed on one driveshaft, including first, second, and third rotation elements, a second reduction mechanism including a second planetary gear set disposed between the second motor shaft and the output shaft, which includes fourth, fifth and sixth rotation elements, and reduces speed of torque input from the second motor and outputs to the output shaft, and a third reduction mechanism including an output gear fixed to one side of the output shaft and the differential ring gear engaged with the output gear.

16 Claims, 6 Drawing Sheets

DRIVING DEVICE FOR ELECTRIC VEHICLES

CROSS-REFERENCE TO RELATED APPLICATION

The present application claims priority to Korean Patent Application No. 10-2023-0180625 filed on Dec. 13, 2023, the entire contents of which is incorporated herein for all purposes by this reference.

BACKGROUND OF THE PRESENT DISCLOSURE

Field of the Present Disclosure

The present disclosure relates to a driving apparatus for an electric vehicle. More particularly, the present disclosure relates to a driving apparatus for an electric vehicle that performs its role appropriately in each driving region of the electric vehicle by combining two motors and three reduction mechanisms.

Description of Related Art

In general, a driving apparatus for an electric vehicle (commonly called an e-Axle, hereinafter referred to as a driving apparatus) requires high efficiency, high performance, and low-cost design and manufacturing within a limited installation space, and depending on whether it is applied as the main drive source in a two-wheel drive (2WD) or four-wheel drive (4WD) electric vehicle, or as an auxiliary drive source in a four-wheel drive (4WD) electric vehicle, it is provided with a high-cost high-efficiency motor system and a low-cost low-efficiency or non-rare earth element motor system.

In cases where such driving apparatus is applied as the main driving source, it is configured as a single driving platform under the condition that satisfies the loadability while focusing on low cost along with high efficiency for improving the travel distance and fuel efficiency (MPGe; Miles Per Gallon gasoline equivalent) of the electric vehicle, and responds to a plurality of required performance specifications by changing only some of the design specifications.

When applying a motor system provided with rare earth element permanent magnets as a driving apparatus, there is a limit to achieving both high efficiency and low cost conditions within a limited installation space with only a simple electrical design change, and when torque and output performance exceeding a certain arbitrary limit are required, the efficiency gain and effect which may be obtained relative to the investment cost decreases rapidly.

Meanwhile, in cases where the driving apparatus is applied as an auxiliary driving source, the focus is on low-cost development rather than high efficiency under conditions that satisfy vehicle performance. Therefore, a motor system provided with an inverter that replaces the expensive power module in the electric power converter of the driving apparatus applied as the main driving source with a low-cost one is adopted, or a motor system provided with a similar motor with lower cost and lower efficiency characteristics than the motor provided with a rare earth element permanent magnet in the main driving source, or a motor system provided with a non-rare earth element motor is adopted.

However, when a motor provided with a permanent magnet is adopted as the driving source of a four-wheel drive (4WD) electric vehicle, when driving a two-wheel drive (2WD) vehicle with only the main driving source, a significant no-load drag (loss) caused by the motor provided with a permanent magnet occurs in the wheel where the auxiliary driving source is positioned, and as a result, there is a problem that the travel distance and fuel efficiency of the four-wheel drive (4WD) electric vehicle are reduced.

To solve the present problem, a separate disconnect device may be added between the differential gear of the auxiliary drive source and the wheel, which causes another problem of increased investment cost and weight.

On the other hand, to implement an auxiliary driving source with the same torque and output specifications as a motor system provided with a non-rare earth element motor, there is a drawback in that the size, volume, or cooling capacity cannot be avoided compared to a driving apparatus that adopts a motor provided with a rare earth element permanent magnet.

Furthermore, when a driving apparatus implemented with a motor provided with a rare earth element permanent magnet requires addition or improvement of hill climbing and towing ability in addition to the basic required performance, changes to the overall design of the reduction mechanism, motor, and electric power converter of the driving apparatus are inevitable, and this causes a problem in that the efficiency gain and effect are lowered compared to the investment cost.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a driving apparatus for an electric vehicle configured for responding to various driving regions by combining two motors and three reduction mechanisms.

Furthermore, the present disclosure attempts to provide a driving apparatus for an electric vehicle that can maintain efficiency gain and effect compared to investment cost or maximize its driving efficiency even if required performance specifications are changed.

A driving apparatus for an electric vehicle according to exemplary embodiments of the present disclosure may include a first motor which is disposed on one of driveshafts of both sides that connects a differential and wheels on both sides and transmits driving torque to the wheels on both sides, and includes a first motor shaft of a hollow shaft disposed to overlap the driveshaft without rotation interference, a second motor disposed parallel to the first motor, an output shaft coaxially disposed with a second motor shaft of the second motor, a first reduction mechanism including a first planetary gear set disposed on one driveshaft, including first, second, and third rotation elements, and reducing the rotation speed of the torque input from the first motor and outputting to a differential ring gear of the differential, a second reduction mechanism including a second planetary gear set disposed between the second motor shaft and the output shaft, which includes fourth, fifth and sixth rotation elements, and reduces speed of torque input from the second motor and outputs to the output shaft, and a third reduction mechanism including an output gear fixed to one side of the output shaft and the differential ring gear engaged with the output gear.

The first rotation element may be connected to the first motor shaft and operates as an input element, the second rotation element may be connected to the differential ring gear of the differential and operates as an output element, and the third rotation element may be fixed to the housing and operates as a fixed element.

The first planetary gear set may be a single pinion planetary gear set, where the first, second, and third rotation elements may be a first sun gear, a first planet carrier, and a first ring gear, respectively.

The fourth rotation element may be connected to the second motor shaft and operates as an input element, the fifth rotation element may be connected to the output shaft and operates as an output element, and the sixth rotation element may be fixed to the housing and operates as a fixed element.

The second planetary gear set may be a single pinion planetary gear set in which the fourth, fifth and sixth rotation elements may be a second sun gear, a second planet carrier, and a second ring gear, respectively.

The first reduction mechanism may be disposed between the second reduction mechanism and the third reduction mechanism.

The third reduction mechanism may be disposed between the second reduction mechanism and the first reduction mechanism.

The output shaft may include a first output shaft connected to the second reduction mechanism and a second output shaft coaxially disposed with the first output shaft and connected to the output gear and the driving apparatus may further include a disconnector mounted between the first and second output shafts.

The disconnector may be one of a clutch group including a dog clutch, or wet-type clutches.

The driving apparatus may further include a transmission mechanism that includes seventh, eighth, and ninth rotation elements as a third planetary gear set, disposed on the first output shaft, and configured to change speed of the driving torque, which is reduced in speed of the driving torque of the second motor through the second reduction mechanism into two speeds and output to the disconnector DC side.

The seventh rotation element may be connected to the first output shaft and operates as an input element, the eighth rotation element may be connected to the disconnector and operates as an output element, and the ninth rotation element may be selectively connectable to the seventh rotation element or housing and operates as an input element or fixed element.

The transmission mechanism may include a clutch mounted between the seventh rotation element and the ninth rotation element and selectively connecting the seventh rotation element and the ninth rotation element, and a brake provided between the ninth rotation element and the housing to selectively connect and secure the ninth rotation element to the housing.

The third planetary gear set may be a single pinion planetary gear set in which the seventh, eighth, and ninth rotation elements are a third sun gear, a third planet carrier, and a third ring gear, respectively.

The driving apparatus may further include an LSD provided between the differential case of the differential and one of the driveshafts on either side to limit the differential function of the differential.

According to the exemplary embodiments of the present disclosure, the driving apparatus for an electric vehicle includes two motors, first and second motors, and three reduction mechanisms including first, second, and third reduction mechanisms, which are combined and operated so that they can appropriately perform their roles in each driving region of the electric vehicle, increasing driving torque and improving acceleration performance during starting and low-speed driving, and improving fuel efficiency of the electric vehicle by driving in an efficient driving point section of the motor.

Furthermore, the driving apparatus for an electric vehicle according to the exemplary embodiments of the present disclosure combines a disconnector DC that blocks the torque of a second motor as an auxiliary driving source, a transmission mechanism that can add a reduction ratio by shifting the torque to two gears shift, and an LSD that limits the differential, so that even if the required performance specifications increase, there is an effect of increasing efficiency gain and driving efficiency in relation to the cost.

Furthermore, the effects which may be obtained or expected due to various exemplary embodiments of the present disclosure are directly or implicitly included in the detailed description of the exemplary embodiments of the present disclosure. That is, various effects predicted according to exemplary embodiments of the present disclosure will be included in the detailed description to be provided later.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
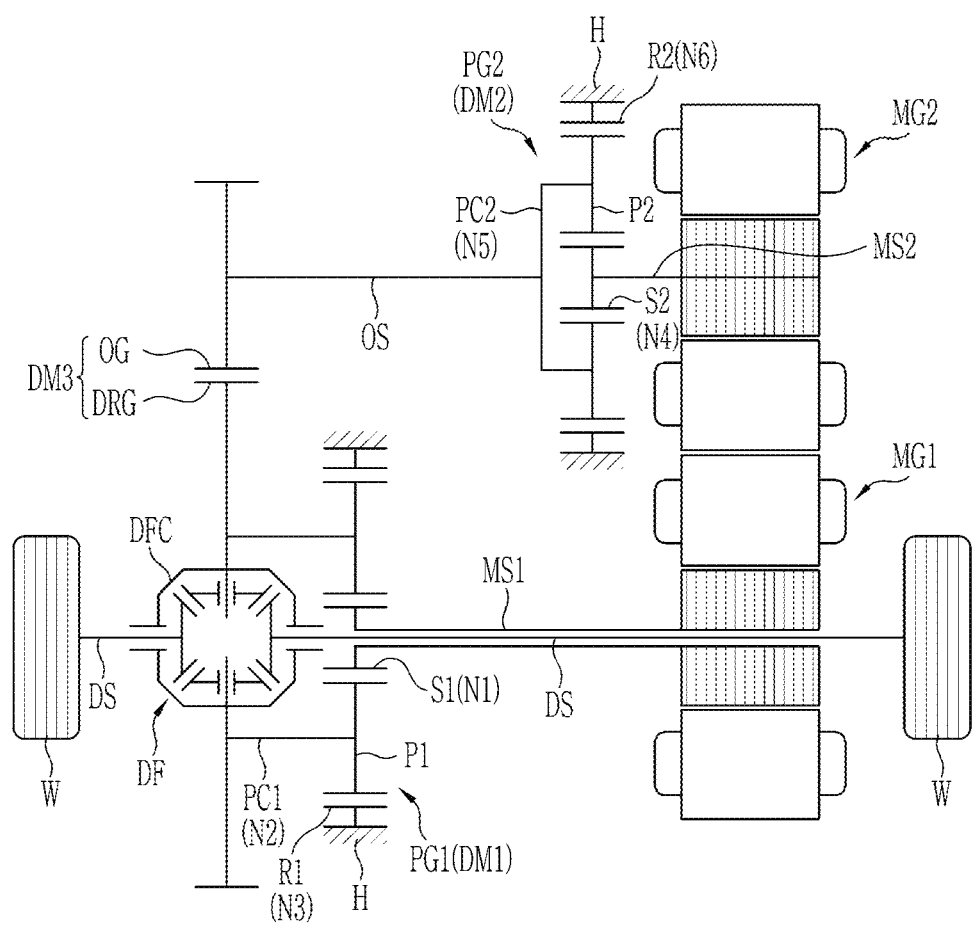
FIG. 1 is a schematic diagram of a driving apparatus for an electric vehicle according to a first exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments included in the present specification will be described in detail with reference to the appended drawings. The same or similar components are provided the same or similar drawing reference numerals, and redundant descriptions thereof are omitted.

In describing the exemplary embodiments included in the present specification, if it is determined that a detailed description of a related known technology may obscure the gist of the exemplary embodiments included in the present specification, the detailed description is omitted. Furthermore, the appended drawings are only intended to facilitate easy understanding of the exemplary embodiments included in the present specification, and the technical ideas included in the present specification are not limited by the appended drawings, but should be understood to include all modifications, equivalents, or substitutes included in the spirit and technical scope of the present disclosure.

Terms including ordinal numbers, such as first, second, etc., may be used to describe various components, but the components are not limited by the terms. The above terms are used solely to distinguish one component from another.

When a component is said to be "connected" or "combined" to another component, it should be understood that it may be directly connected or combined to that other component, but there may also be other components in between. On the other hand, when a component is said to be "directly connected" or "directly combined" to another component, it should be understood that there are no other components in between.

In the present application, terms such as "include" or "have" should be understood to specify the presence of a feature, number, step, operation, component, part or combination thereof described in the specification, but not to exclude in advance the possibility of the presence or addition of one or more other features, numbers, steps, operations, components, parts or combinations thereof.

Terms such as "-unit", "-portion", "-part", "-module", and "-means" described in the specification are assigned or used interchangeably only for the convenience of writing the specification, and do not have distinct meanings or roles in themselves. Additionally, terms such as "-unit", "-portion", "-part", "-module", and "-means" described in the specification may mean a unit that processes at least one function or operation, which may be implemented by hardware, software, or a combination of hardware and software.

As used herein, the singular forms are intended to include the plural forms as well, unless the context clearly indicates otherwise. As used herein, the term "and/or" includes any one or all combinations of the associated listed items.

FIG. 1 is a schematic diagram of a driving apparatus for an electric vehicle according to a first exemplary embodiment of the present disclosure.

Referring to FIG. 1, a driving apparatus for an electric vehicle (hereinafter, referred to as driving apparatus) according to a first exemplary embodiment of the present disclosure includes a first motor MG1, a second motor MG2, an output shaft OS, first, second, and third reduction mechanisms DM1, DM2, and DM3.

That is, the driving apparatus according to the first exemplary embodiment of the present disclosure may use two motors, including a first motor MG1 and a second motor MG2, as a driving source.

The first and second motors MG1 and MG2 can perform motor and generator functions, and each includes a stator fixed to the housing and a rotor rotatably supported in the radial direction, and in the first exemplary embodiment of the present disclosure, perform the function of a driving motor as their main function.

The driving apparatus according to a first exemplary embodiment of the present disclosure includes a differential DF, and the differential DF and both wheels W are connected to enable power delivery through a driveshaft DS, respectively.

The first motor MG1 is disposed on one of the driveshafts DS on both sides thereof, which transmit driving torque to the wheels W on both sides.

The first motor MG1 includes a first motor shaft MS1, which is a hollow shaft, and the first motor shaft MS1 is disposed to overlap with one-sided driveshaft DS without rotation interference. That is, the one-sided driveshaft DS is disposed to penetrate the first motor MG1 and the first motor shaft MS1.

The second motor MG2 is disposed parallel to the first motor MG1.

The output shaft OS is disposed coaxially with a second motor shaft MS2 of the second motor MG2.

The first reduction mechanism DM1 may include a first planetary gear set PG1 disposed on the driveshaft DS, including first, second, and third rotation elements N1, N2, and N3. The first reduction mechanism DM1 is configured to reduce the speed of the rotational power input from the first motor MG1 and output the reduced speed of the rotational power to a differential ring gear DRG of the differential DF.

The first reduction mechanism DM1 operates as an input element with the first rotation element N1 connected to the first motor shaft MS1, the second rotation element N2 connected to the differential ring gear DRG of the differential DF and operates as an output element, and the third rotation element N3 is fixed to the housing H and operates as a fixed element.

The first planetary gear set PG1, which is the first reduction mechanism DM1, may be a single pinion planetary gear set and include a first sun gear S1, which is the first rotation element N1, a first planet carrier PC1, which supports rotation and revolution of a plurality of first pinion gears P1 that are externally engaged radially equally spaced on the external circumference of the first sun gear S1, and the third rotation element N3, which is a first ring gear R1, which is internally engaged with a plurality of first pinion gears P1 and is power connected to the first sun gear S1.

The second reduction mechanism DM2 may include fourth, fifth, sixth rotation elements N4, N5, and N6 and may be a second planetary gear set PG2 disposed between the second motor shaft MS2 and the output shaft OS. The second reduction mechanism DM2 is configured to reduce the speed of the rotational power input from the second motor MG2 and output the reduced speed of the rotational power to the output shaft OS.

The second reduction mechanism DM2 operates as an input element with the fourth rotation element N4 connected to the second motor shaft MS2, the fifth rotation element N5 connected to the output shaft OS and operates as an output element, and the sixth rotation element N6 is fixed to the housing H and operates as a fixed element.

The second planetary gear set PG2, which is the second reduction mechanism DM2, may be a single pinion planetary gear set and include a second sun gear S2, which is the fourth rotation element N4, a second planet carrier PC2, which is the fifth rotation element N5 and supports rotation and revolution of a plurality of second pinion gears P2 that are externally engaged radially equally spaced on the external circumference of the second sun gear S2, and a second ring gear R2, which is the sixth rotation element N6 which is internally engaged with a plurality of second pinion gears P2 and is power connected to the second sun gear S2.

The third reduction mechanism DM3 includes an output gear OG fixed to one side of the output shaft OS and a differential ring gear DRG externally engaged with the output gear OG.

The first reduction mechanism DM1 is placed between the second reduction mechanism DM2 and the third reduction mechanism DM3, and may be disposed in an order of the second reduction mechanism DM2, the first reduction mechanism DM1, and the third reduction mechanism DM3, with the first and second motors MG1 and MG2 as references.

The driving apparatus according to the first exemplary embodiment of the present disclosure includes an integrated driving system in which first and second motors MG1, and MG2, first, second, and third reduction mechanisms DM1, DM2, and DM3, and a separate electric power converter are mounted in one housing H.

The first, the second motors MG1 and MG2 may be applied with different types of motors, such as a motor with a rare earth element permanent magnet or a motor with a non-rare earth element permanent magnet, or with different specifications of the same type with a relative difference in the maximum rotation speed of at least 5,000 RPM.

It is preferable that the stacking length of the second motor MG2 be designed so as not to exceed the stacking length of the first motor MG1, and even if it exceeds it, it may be designed to satisfy the loadability of the driving apparatus or not to affect the axial direction length (overall length) of the driving apparatus.

According to the first exemplary embodiment of the present disclosure, when the first motor MG1 drives the driving apparatus, the torque is input to the first sun gear S1, which is the first rotation element N1, through the first motor shaft MS1, and the first ring gear R1, which is the third rotation element N3, acts as a fixed element, and the speed is reduced through the first planet carrier PC1, which is the second rotation element N2, and transmitted to the differential ring gear DRG of the differential DF.

Accordingly, the differential DF transmits driving torque to both wheels W through both driveshafts DS while compensating for the difference in rotation speed of the wheels W on both sides.

When the second motor MG2 is driven, the torque is input to the second sun gear S2, which is the fourth rotation element N4, through the second motor shaft MS2, and the second ring gear R2, which is the sixth rotation element N6, acts as a fixed element, and the speed is reduced through the second planet carrier PC2, which is the fifth rotation element N5, and transmitted to the output shaft OS.

The torque transmitted to the output shaft OS is transmitted to the differential ring gear DRG of the differential DF through the output gear OG. Accordingly, the differential DF transmits the driving torque to the wheels W on both sides through the driveshafts DS on both sides together with the torque of the first motor MG1 while compensating for the difference in rotation speed of the wheels W on both sides.

The driving apparatus operates only the first motor MG1 in the travel distance or fuel economy driving region to enable high efficiency driving, and in the high load driving region, the first, second motors MG1, and MG2 are operated simultaneously to supplement the insufficient torque and output of the wheels by the first motor MG1 with the torque and output by the second motor MG2.

Figure 2:
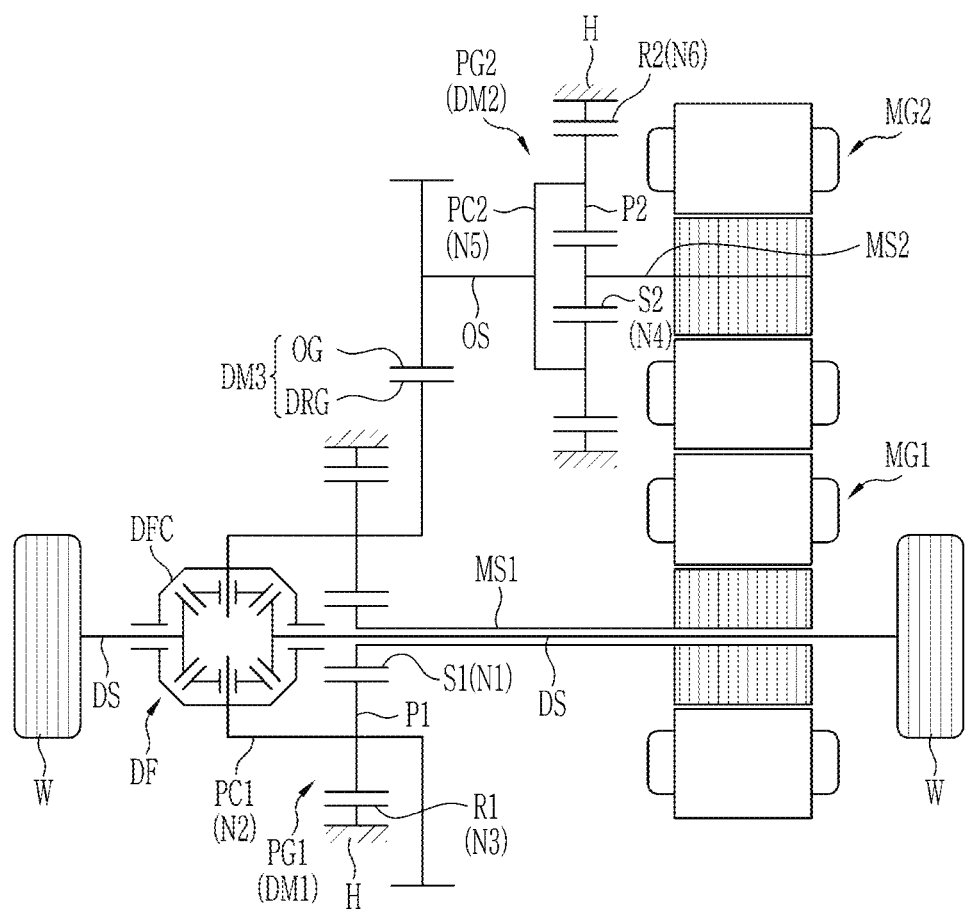
FIG. 2 is a schematic diagram of a driving apparatus for an electric vehicle according to a second exemplary embodiment of the present disclosure.

FIG. 2 is a schematic diagram of a driving apparatus for an electric vehicle according to a second exemplary embodiment of the present disclosure.

For convenience of understanding, when describing a driving apparatus for an electric vehicle according to a second exemplary embodiment of the present disclosure, the same components as those described above according to the driving apparatus for an electric vehicle according to the first exemplary embodiment of the present disclosure will be denoted by the same reference numerals.

Referring to FIG. 2, the driving apparatus according to the second exemplary embodiment of the present disclosure differs from the first exemplary embodiment only in the arrangement positions of the first, second, and third reduction mechanisms DM1, DM2, and DM3.

That is, the driving apparatus according to the first exemplary embodiment of the present disclosure includes the first reduction mechanism DM1 positioned between the second reduction mechanism DM2 and the third reduction mechanism DM3, but the driving apparatus according to the second exemplary embodiment of the present disclosure includes the third reduction mechanism DM3 positioned between the second reduction mechanism DM2 and the first reduction mechanism DM1. That is, in the second exemplary embodiment, the second reduction mechanism DM2, the third reduction mechanism DM3, and the first reduction mechanism DM1 may be disposed in that order, with the first and second motors MG1 and MG2 as references.

Thus, the driving apparatus according to the second exemplary embodiment of the present disclosure differs from the first exemplary embodiment only in the arrangement positions of the first, second, and third reduction mechanisms DM1, DM2, and DM3, and all other components and the connection relationships and operations of each component are the same as those of the first exemplary embodiment, so a detailed description is omitted.

Figure 3:
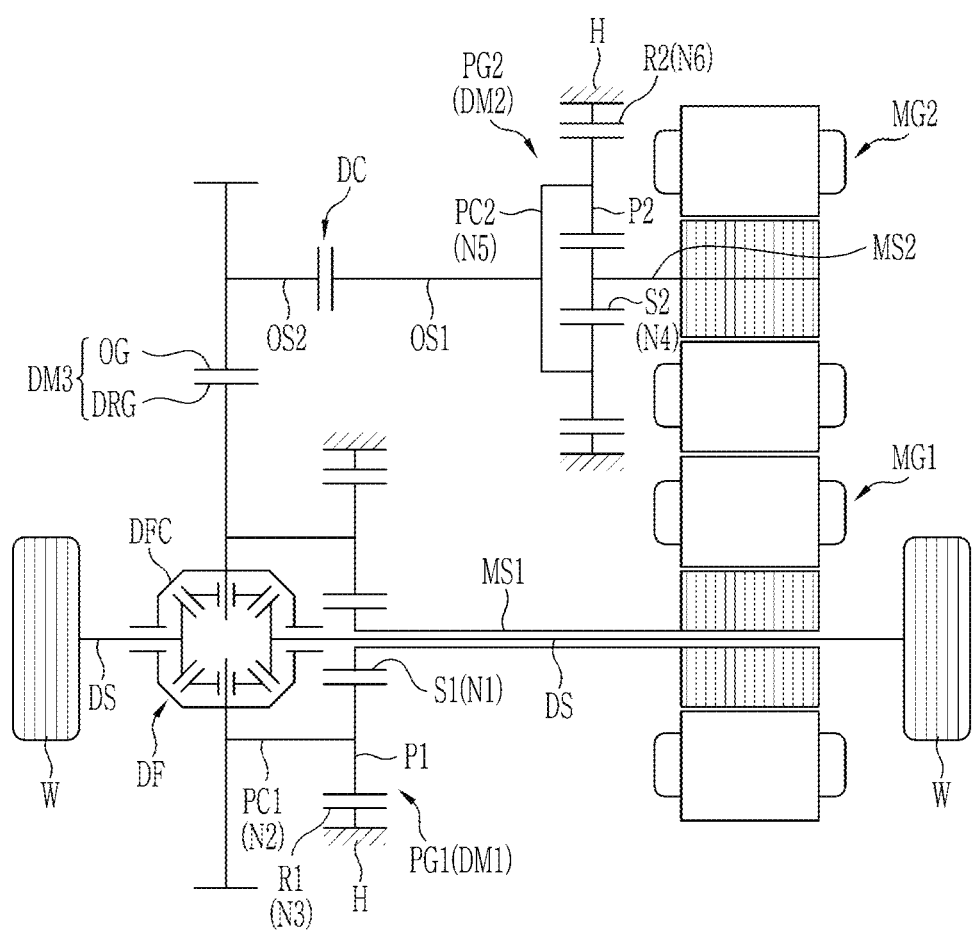
FIG. 3 is a schematic diagram of a driving apparatus for an electric vehicle according to a third exemplary embodiment of the present disclosure.

FIG. 3 is a schematic diagram of a driving apparatus for an electric vehicle according to a third exemplary embodiment of the present disclosure.

For the convenience of understanding, when explaining a driving apparatus for an electric vehicle according to a third exemplary embodiment of the present disclosure, the same components as those of the driving apparatus for an electric vehicle according to the first exemplary embodiment of the present disclosure described above will be provided the same reference numerals.

Referring to FIG. 3, a driving apparatus according to a third exemplary embodiment of the present disclosure differs from the first exemplary embodiment in that a disconnector DC is added on the output shaft OS.

The driving apparatus according to a third exemplary embodiment of the present disclosure includes first and second output shafts OS1 and OS2 on a coaxial line, the first output shaft OS1 being connected to the second planet carrier PC2 which is the fifth rotation element N5 of the second reduction mechanism DM2, the second output shaft OS2 being connected to the output gear OG, and the disconnector DC may be configured between the first and second output shafts OS1 and OS2.

The disconnector DC may include a dog clutch, but is not limited thereto. The disconnector DC may include a wet multi-plate clutch or a dry multi-plate clutch operated by hydraulic pressure supplied from a hydraulic pressure control apparatus. Additionally, the disconnector DC may include a coupling element that operates according to an electrical signal supplied from an electron control apparatus, such as an electron-type clutch or a magnetic clutch. That is, the disconnector DC may be any one of various types of clutch groups, such as dog clutch, wet-type clutches, etc.

The driving apparatus according to the third exemplary embodiment of the present disclosure differs from the first exemplary embodiment in that the disconnector DC is added on the output shaft OS, but all other components and the connection relationships between each component are the same as those of the first exemplary embodiment, so a detailed description of the configuration is omitted.

The driving apparatus according to the third exemplary embodiment of the present disclosure may enable high efficiency driving by disengaging the disconnector DC to block the power delivery path with the second motor MG2 and operating only the first motor MG1 in a travel distance or fuel economy driving region. Furthermore, in a high load driving region, the first, second motors MG1, and MG2 are operated simultaneously with the disconnector DC engaged so that the insufficient torque and output of the wheel by the first motor MG1 may be supplemented by the torque and output by the second motor MG2.

According to the third exemplary embodiment, when the driving apparatus is applied as a driving apparatus on the main driving wheel side of a four-wheel drive (4WD) electric vehicle and the driving condition is a two-wheel drive (2WD), or when the driving apparatus is applied as a driving apparatus on the auxiliary driving wheel side and the driving condition is a low-load four-wheel drive (4WD), the disconnector DC is released to remove the no-load drag (loss) to the wheels generated from the second motor MG2, and to enable immediate response driving using only the torque and output of the first motor MG1.

On the other hand, when the driving apparatus is applied to the main or auxiliary driving wheel side and is in a constant four-wheel drive (4WD) driving condition or a four-wheel drive (4WD) condition with a medium load or higher, the first and second motors MG1 and MG2 are operated simultaneously with the disconnector DC engaged so that the insufficient torque and output of the wheel by the first motor MG1 may be supplemented by the torque and output by the second motor MG2.

Figure 4:
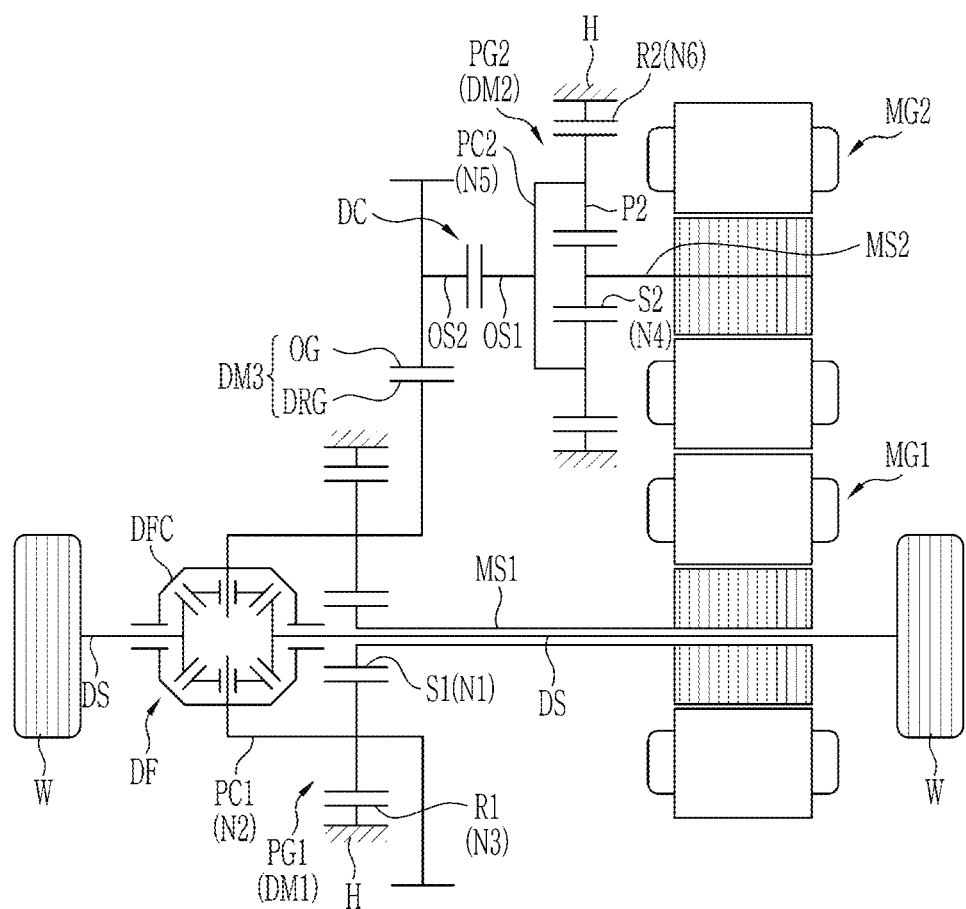
FIG. 4 is a schematic diagram of a driving apparatus for an electric vehicle according to a fourth exemplary embodiment of the present disclosure.

FIG. 4 is a schematic diagram of a driving apparatus for an electric vehicle according to a fourth exemplary embodiment of the present disclosure.

For convenience of understanding, when explaining a driving apparatus for an electric vehicle according to the fourth exemplary embodiment of the present disclosure, the same components as those of the driving apparatus for an electric vehicle according to the third exemplary embodiment of the present disclosure described above will be provided the same reference numerals.

Referring to FIG. 4, the driving apparatus according to the fourth exemplary embodiment of the present disclosure differs from the third exemplary embodiment only in the arrangement positions of the first, second, and third reduction mechanisms DM1, DM2, and DM3.

That is, the driving apparatus according to the third exemplary embodiment of the present disclosure includes the first reduction mechanism DM1 positioned between the second reduction mechanism DM2 and the third reduction mechanism DM3, but there is a difference in that the fourth exemplary embodiment includes the third reduction mechanism DM3 positioned between the second reduction mechanism DM2 and the first reduction mechanism DM1. In the fourth exemplary embodiment, the second reduction mechanism DM2, the third reduction mechanism DM3, and the first reduction mechanism DM1 may be disposed in that order, with the first and second motors MG1 and MG2 as references.

Thus, the driving apparatus according to the fourth exemplary embodiment of the present disclosure differs only in the arrangement positions of the first, second, and third reduction mechanisms DM1, DM2, and DM3 compared to the third exemplary embodiment, and all other components and the connection relationships and operations of each component are the same as those of the third exemplary embodiment, so a detailed description is omitted.

Figure 5:
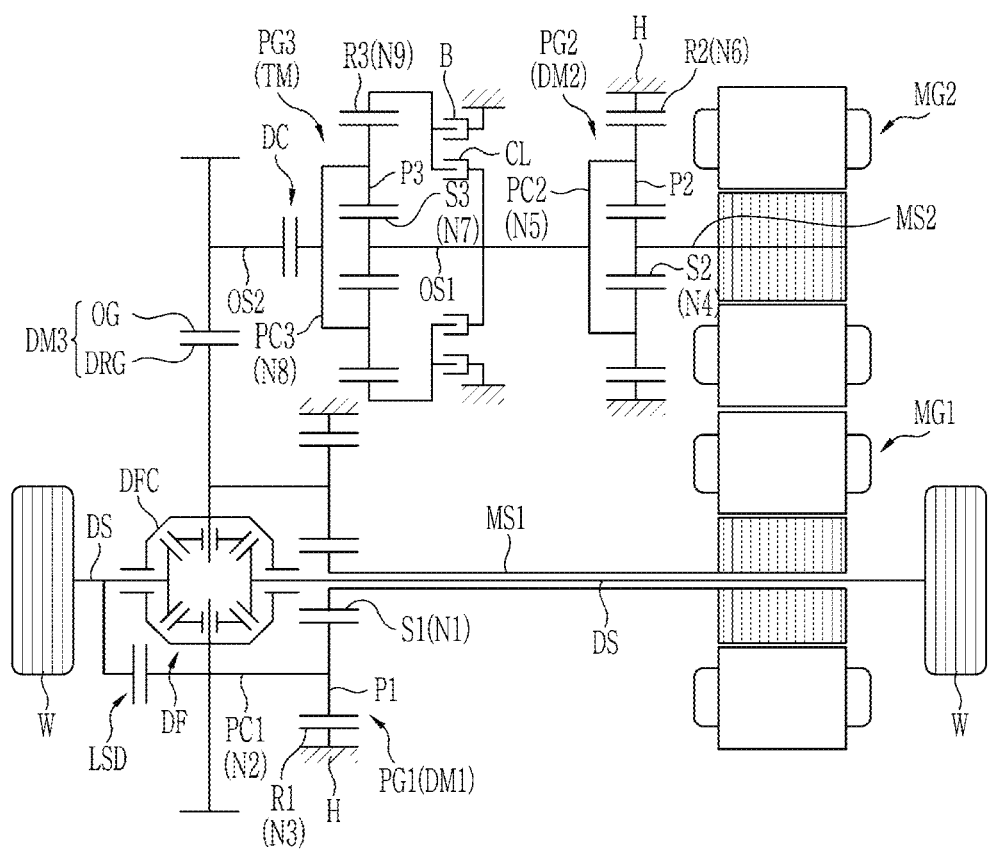
FIG. 5 is a schematic diagram of a driving apparatus for an electric vehicle according to a fifth exemplary embodiment of the present disclosure.

FIG. 5 is a schematic diagram of a driving apparatus for an electric vehicle according to a fifth exemplary embodiment of the present disclosure.

For convenience of understanding, when explaining a driving apparatus for an electric vehicle according to the fifth exemplary embodiment of the present disclosure, the same components as those of the driving apparatus for an electric vehicle according to the third exemplary embodiment of the present disclosure described above will be provided the same reference numerals.

Referring to FIG. 5, the driving apparatus according to the fifth exemplary embodiment of the present disclosure differs from the third exemplary embodiment in that a transmission mechanism TM is added which changes the torque input along the line of the first output shaft OS1 into two shifted speed and outputs the shifted speed, and an LSD (limited slip differential) which limits the differential function is additionally provided in the differential DF.

The transmission mechanism TM may be a third planetary gear set PG3 disposed on the first output shaft OS1, including seventh, eighth, and ninth rotation elements N7, N8, and N9. The transmission mechanism TM is configured to change speed of the driving torque, which is reduced in speed of the driving torque of the second motor MG2 though the second reduction mechanism DM2 into two speeds and output the shifted speed to the disconnector DC side.

The transmission mechanism TM is configured so that the seventh rotation element N7 is connected to the first output shaft OS1 and operates as an input element, the eighth rotation element N8 is connected to the disconnector DC connected to the second output shaft OS2 and operates as an output element, and the ninth rotation element N9 is selectively connectable to the seventh rotation element N7 or housing H and operates as an input element or a fixed element.

The transmission mechanism TM, the third planetary gear set PG3 as a single pinion planetary gear set, may include a third sun gear S3, which is the seventh rotation element N7, a third planet carrier PC3, which is connected to the second output shaft OS2 as the eighth rotation element N8, supports rotation and revolution through a plurality of third pinion gears P3 that are externally engaged radially equally spaced on the external circumference of the third sun gear S3, and a third ring gear R3, which is the ninth rotation element N9 which is internally engaged with a plurality of third pinion gears P3 and is power connected to the third sun gear S3.

Furthermore, the transmission mechanism TM includes a clutch CL disposed between the third sun gear S3, which is the seventh rotation element N7, and the third ring gear R3, which is the ninth rotation element N9, to selectively connect the seventh rotation element N7 and the ninth rotation element N9, or a brake B provided between the ninth rotation element N9 and the housing H to connect and fix the ninth rotation element N9 to the housing H.

The clutch CL interconnects the seventh rotation element N7 and the ninth rotation element N9 so that the third planetary gear set PG3 itself can rotate as a single rotation body, and brake B fixes the ninth rotation element N9 in the rotation direction so that it can act as a fixed element.

And the LSD (limited slip differential) may be configured between the differential case DFC of the differential DF and the other side driveshaft DS to limit the differential function of the differential DF, and an electronic limited-slip differential (E-LSD) that operates electronically may be applied.

The driving apparatus according to the fifth exemplary embodiment of the present disclosure differs from the third exemplary embodiment in that the transmission mechanism TM is added on the first output shaft OS1, and the LSD is added to the differential DF. Aside from this, all other components and the connection relationships between each component are the same as those of the third exemplary embodiment, so a detailed description of the configuration is omitted.

The driving apparatus according to the fifth exemplary embodiment of the present disclosure enables high efficiency driving by disengaging the disconnector DC to block the power delivery path with the second motor MG2 and operating only the first motor MG1 in a travel distance or fuel economy driving region, and simultaneously operating the first and second motors MG1 and MG2 with the disconnector DC engaged in a high load driving region, so that the insufficient torque and output of the wheel by the first motor MG1 may be supplemented by the torque and output by the second motor MG2.

The transmission mechanism TM can implement a first-speed gear shifting that provides greater torque by engaging the brake B while releasing the clutch CL to reduce the rotation speed of the torque output to the first output shaft OS1 when greater torque is required from the second motor MG2. Furthermore, the transmission mechanism TM can implement a second-speed gear shifting in which the torque is output as input by engaging the clutch CL while releasing the brake B and allowing the third planetary gear set PG3 itself to operate as a single rotating body.

The Brake B and clutch CL may include a multi-plate clutch operated by hydraulic pressure supplied from a hydraulic pressure control apparatus. A wet multi-plate clutch may be applied, and a dry multi-plate clutch may also be applied. Furthermore, a coupling element that operates according to an electrical signal supplied from an electron control apparatus, such as a dog clutch, an electron-type clutch, or a magnetic clutch, may be applied.

According to the fifth exemplary embodiment, when the driving apparatus is applied as the driving apparatus on the main driving wheel side in a four-wheel drive (4WD) electric vehicle and the driving condition is a two-wheel drive (2WD), or when the driving apparatus is applied as the driving apparatus on the auxiliary driving wheel side and the driving condition is a low-load four-wheel drive (4WD), the disconnector DC is released to remove the no-load drag (loss) to the wheels generated from the second motor MG2, and to enable immediate response driving using only the torque and output of the first motor MG1.

On the other hand, when the driving apparatus is applied to the main or auxiliary driving wheel side and is in a constant four-wheel drive (4WD) driving condition or a four-wheel drive (4WD) driving condition of a medium load or higher, the first and second motors MG1 and MG2 are operated simultaneously with the disconnector DC engaged so that the insufficient torque and output of the wheel by the first motor MG1 may be supplemented by the torque and output by the second motor MG2.

In the instant case, the transmission mechanism TM can respond by implementing the first-speed gear shifting together with the operation control of the LSD in driving conditions that require greater torque from the second motor MG2, such as starting at low speeds, and hill climbing and towing, and can respond by implementing the second-speed gear shifting in driving conditions that require the highest vehicle speed performance, such as overtaking and acceleration.

Figure 6:
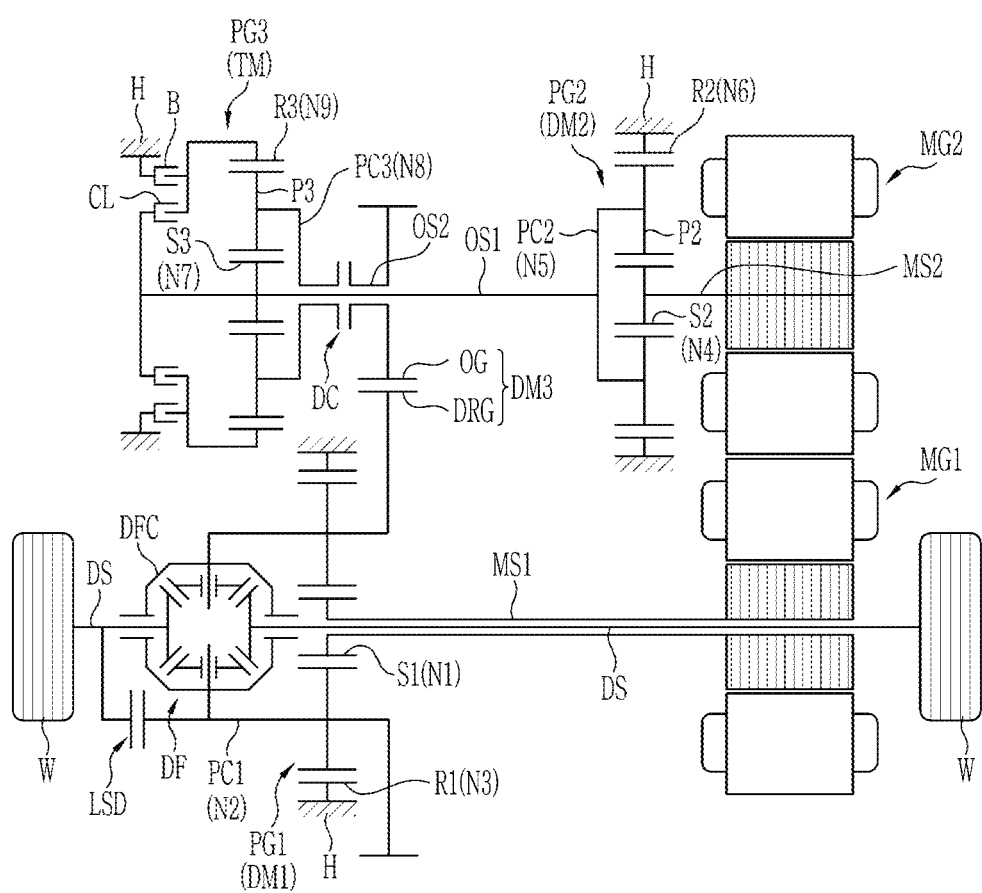
FIG. 6 is a schematic diagram of a driving apparatus for an electric vehicle according to a sixth embodiment of the present disclosure.

FIG. 6 is a schematic diagram of a driving apparatus for an electric vehicle according to the sixth embodiment of the present disclosure.

For convenience of understanding, when describing a driving apparatus for an electric vehicle according to the sixth embodiment of the present disclosure, the same components as those described above for the driving apparatus for an electric vehicle according to the fifth exemplary embodiment of the present disclosure will be provided the same reference numerals.

Referring to FIG. 6, the driving apparatus according to the sixth embodiment of the present disclosure has a difference in the arrangement positions of the first, second, and third reduction mechanisms DM1, DM2, and DM3 compared to the fifth exemplary embodiment, and the second output shaft OS2 is formed as a hollow shaft and is disposed on the external circumference of the first output shaft OS1 without rotation interference.

That is, the driving apparatus according to the fifth exemplary embodiment of the present disclosure includes the first reduction mechanism DM1 positioned between the second reduction mechanism DM2 and the third reduction mechanism DM3, but there is a difference in that the sixth embodiment includes the third reduction mechanism DM3 positioned between the second reduction mechanism DM2 and the first reduction mechanism DM1. In the sixth embodiment, the second reduction mechanism DM2, the third reduction mechanism DM3, and the first reduction mechanism DM1 may be disposed in that order, with the first and second motors MG1 and MG2 as references.

Additionally, the second output shaft OS2 is disposed on the external circumference of the first output shaft OS1 with the transmission mechanism TM moved outward according to the arrangement of the third reduction mechanism DM3.

Thus, the driving apparatus according to the sixth embodiment of the present disclosure differs from the fifth exemplary embodiment only in the arrangement positions of the first, second, and third reduction mechanisms DM1, DM2, and DM3 and the configuration of the second output shaft OS2, and all other components and the connection relationships and operations of each component are the same as those of the fifth exemplary embodiment, so a detailed description is omitted.

Therefore, the driving apparatus according to the first, second, third, fourth, fifth and sixth embodiments of the present disclosure as described above can perform optimal operation for each driving region of the electric vehicle by combining the first and second motors MG1 and MG2 and the first, second, and third reduction mechanisms DM1, DM2 and DM3. That is, the driving apparatus according to the exemplary embodiments of the present disclosure can increase driving torque and improve acceleration performance during starting and low-speed driving, and can improve the fuel efficiency of an electric vehicle by driving in an efficient operating point range of the motor.

Furthermore, by combining the disconnector DC that blocks the torque of the second motor MG, the transmission mechanism TM that adds a reduction ratio by shifting the torque of the second motor MG2 to two gear shiftings, and the LSD for differential limitation, even if the required performance specifications increase, cost-effectiveness and operating efficiency may be improved.

Furthermore, the term of "fixedly connected" signifies that fixedly connected members always rotate at the same speed. Furthermore, the term of "selectively connectable" signifies "selectively connectable members rotate separately when the selectively connectable members are not engaged to each other, rotate at the same speed when the selectively connectable members are engaged to each other, and are stationary when at least one of the selectively connectable members is a stationary member and remaining selectively connectable members are engaged to the stationary member".

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A driving apparatus for an electric vehicle, the driving apparatus comprising:
    a first motor which is disposed on one of driveshafts of first and second sides that connects a differential and wheels on the first and second sides and transmits driving torque to the wheels on the first and second sides, and includes a first motor shaft of a hollow shaft disposed to overlap the driveshaft without rotation interference therebetween;
    a second motor disposed parallel to the first motor;
    an output shaft coaxially disposed with a second motor shaft of the second motor;
    a first reduction mechanism including a first planetary gear set disposed on one driveshaft, including first, second, and third rotation elements, and reducing a rotation speed of a torque input from the first motor and outputting to a differential ring gear of the differential;
    a second reduction mechanism including a second planetary gear set disposed between the second motor shaft and the output shaft, which includes fourth, fifth and sixth rotation elements, and reduces a speed of a torque input from the second motor and outputs to the output shaft; and
    a third reduction mechanism including an output gear fixed to one side of the output shaft and the differential ring gear engaged with the output gear,
    wherein the fourth rotation element is connected to the second motor shaft and operates as an input element, the fifth rotation element is connected to the output shaft and operates as an output element, and the sixth rotation element is fixed to a housing and operates as a fixed element.

2. The driving apparatus of claim 1, wherein the first rotation element is connected to the first motor shaft and operates as an input element, the second rotation element is connected to the differential ring gear of the differential and operates as an output element, and the third rotation element is fixed to the housing and operates as a fixed element.

3. The driving apparatus of claim 1, wherein the first planetary gear set is a single pinion planetary gear set, where the first, second, and third rotation elements are a first sun gear, a first planet carrier, and a first ring gear, respectively.

4. The driving apparatus of claim 3,
    wherein the first sun gear is connected to the first motor shaft,
    wherein the first planet carrier is connected to the differential ring gear and coupled to a first pinion gear engaged to the first sun gear, and
    wherein the first ring gear is connected to the housing and engaged to the first pinion gear.

5. The driving apparatus of claim 1, wherein the first reduction mechanism is disposed between the second reduction mechanism and the third reduction mechanism.

6. The driving apparatus of claim 1, wherein the third reduction mechanism is disposed between the second reduction mechanism and the first reduction mechanism.

7. The driving apparatus of claim 1, further including a limited slip differential (LSD) provided between a differential case of the differential and one of the driveshafts on either side to limit a differential function of the differential.

8. A driving apparatus for an electric vehicle, the driving apparatus comprising:
a first motor which is disposed on one of driveshafts of first and second sides that connects a differential and wheels on the first and second sides and transmits driving torque to the wheels on the first and second sides, and includes a first motor shaft of a hollow shaft disposed to overlap the driveshaft without rotation interference therebetween;
a second motor disposed parallel to the first motor;
an output shaft coaxially disposed with a second motor shaft of the second motor;
a first reduction mechanism including a first planetary gear set disposed on one driveshaft, including first, second, and third rotation elements, and reducing a rotation speed of a torque input from the first motor and outputting to a differential ring gear of the differential;
a second reduction mechanism including a second planetary gear set disposed between the second motor shaft and the output shaft, which includes fourth, fifth and sixth rotation elements, and reduces a speed of a torque input from the second motor and outputs to the output shaft; and
a third reduction mechanism including an output gear fixed to one side of the output shaft and the differential ring gear engaged with the output gear,
wherein the second planetary gear set is a single pinion planetary gear set in which the fourth, fifth and sixth rotation elements are a second sun gear, a second planet carrier, and a second ring gear, respectively,
wherein the second sun gear is connected to the second motor shaft,
wherein the second planet carrier is connected to the output shaft and coupled to a second pinion gear engaged to the second sun gear, and
wherein the second ring gear is connected to a housing and engaged to the second ring gear.

9. A driving apparatus for an electric vehicle, the driving apparatus comprising:
a first motor which is disposed on one of driveshafts of first and second sides that connects a differential and wheels on the first and second sides and transmits driving torque to the wheels on the first and second sides, and includes a first motor shaft of a hollow shaft disposed to overlap the driveshaft without rotation interference therebetween;
a second motor disposed parallel to the first motor;
an output shaft coaxially disposed with a second motor shaft of the second motor;
a first reduction mechanism including a first planetary gear set disposed on one driveshaft, including first, second, and third rotation elements, and reducing a rotation speed of a torque input from the first motor and outputting to a differential ring gear of the differential;
a second reduction mechanism including a second planetary gear set disposed between the second motor shaft and the output shaft, which includes fourth, fifth and sixth rotation elements, and reduces a speed of a torque input from the second motor and outputs to the output shaft; and
a third reduction mechanism including an output gear fixed to one side of the output shaft and the differential ring gear engaged with the output gear,
wherein the output shaft includes a first output shaft connected to the second reduction mechanism and a second output shaft coaxially disposed with the first output shaft and connected to the output gear, and
wherein the driving apparatus further includes a disconnector mounted between the first and second output shafts.

10. The driving apparatus of claim 9, wherein the disconnector is one of a clutch group including a dog clutch, or wet-type clutches.

11. The driving apparatus of claim 9, further including a transmission mechanism that includes seventh, eighth, and ninth rotation elements as a third planetary gear set, mounted on the first output shaft, and configured to change speed of a driving torque, which is reduced in speed of a driving torque of the second motor through the second reduction mechanism into two speeds and output to a disconnector side.

12. The driving apparatus of claim 11, wherein the seventh rotation element is connected to the first output shaft and operates as an input element, the eighth rotation element is connected to the disconnector mounted on the second output shaft and operates as an output element, and the ninth rotation element is selectively connectable to the seventh rotation element or a housing and operates as an input element or a fixed element.

13. The driving apparatus of claim 12, wherein the transmission mechanism further includes:
a clutch mounted between the seventh rotation element and the ninth rotation element and selectively connecting the seventh rotation element and the ninth rotation element; and
a brake provided between the ninth rotation element and the housing to selectively connect and secure the ninth rotation element to the housing.

14. The driving apparatus of claim 11, wherein the third planetary gear set is a single pinion planetary gear set in which the seventh, eighth, and ninth rotation elements are a third sun gear, a third planet carrier, and a third ring gear, respectively.

15. The driving apparatus of claim 14,
wherein the third sun gear is connected to the first output shaft,
wherein the third planet carrier is connected to a third planet gear engaged to the third sun gear and the third ring gear and connected to the second output shaft, and
wherein the output gear is connected to the second output shaft, and
wherein the disconnector is mounted in the second output shaft between the third planet carrier and the output gear.

16. The driving apparatus of claim 14,
wherein the third sun gear is connected to the first output shaft,
wherein the third planet carrier is connected to a third planet gear engaged to the third sun gear and the third ring gear and to the second output shaft rotatably coupled to the first output shaft, and
wherein the output gear is mounted in the second output shaft, and wherein the disconnector is mounted in the second output shaft between the third planet carrier and the output gear.

* * * * *